United States Patent [19]

Else

[11] Patent Number: 4,696,033
[45] Date of Patent: Sep. 22, 1987

[54] ONE-PIECE TELEPHONE HOOK SWITCH OPERATING MECHANISM

[75] Inventor: Ronald Else, Woodbridge, England

[73] Assignee: British Telecommunications public limited company, Great Britain

[21] Appl. No.: 694,038

[22] Filed: Jan. 23, 1985

[30] Foreign Application Priority Data

Jan. 23, 1984 [GB] United Kingdom ............... 8401721

[51] Int. Cl.⁴ .......................................... H04M 1/08
[52] U.S. Cl. .................................. 379/424; 379/429
[58] Field of Search ............... 179/164, 159, 100 D, 179/103; 379/424, 429

[56] References Cited

U.S. PATENT DOCUMENTS 2,183,744 12/1939 Hubbell ............................. 379/370
2,972,021 2/1961 Bryant et al. ..................... 379/375

FOREIGN PATENT DOCUMENTS 2350744 12/1977 France .
0158631 9/1984 Japan .................................. 379/424
WO82/02989 9/1982 PCT Int'l Appl. ................. 379/424

*Primary Examiner*—Thomas W. Brown
*Attorney, Agent, or Firm*—Nixon & Vanderhye

[57] ABSTRACT

A switch operating mechanism for use in a telephone instrument (for example, for operating a hook switch) has two arms (4 and 5) for projection from—and independent displacement with respect to—an outer surface of the instrument body (1). The arms (4 and 5) are arranged to co-operate with a switch actuating member (13) such that this member adopts a first position when both arms (4 and 5) are retracted with respect to the body (1), and a second position when one or both of the arms (4 and 5) is or are extended from the body (1). This mechanism is particularly advantageous for operating the hook switch in a one-piece telephone instrument because inadvertent depression of one of the arms (4 or 5) does not cause actuation of the hook switch.

7 Claims, 14 Drawing Figures

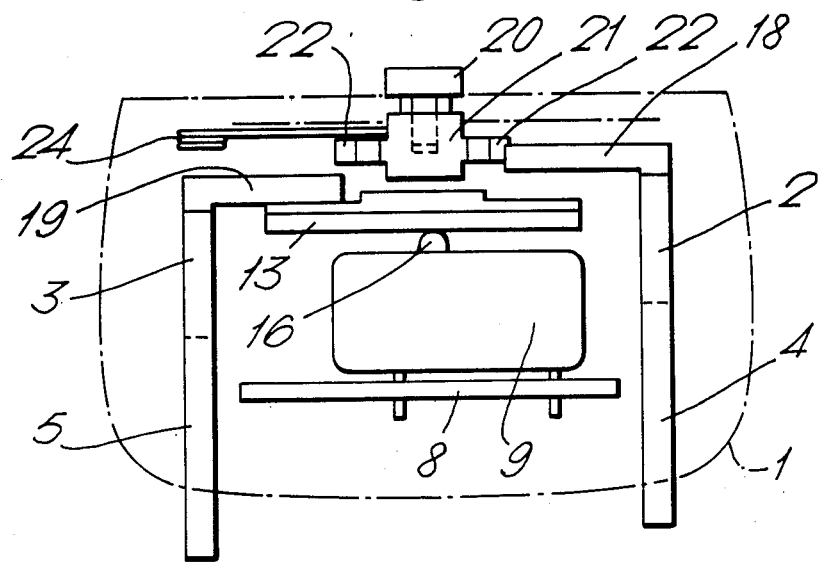
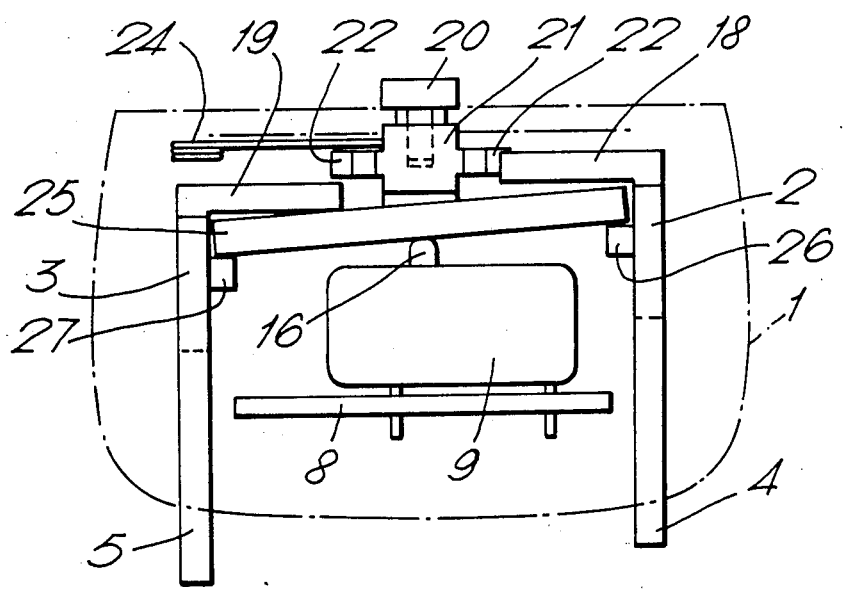

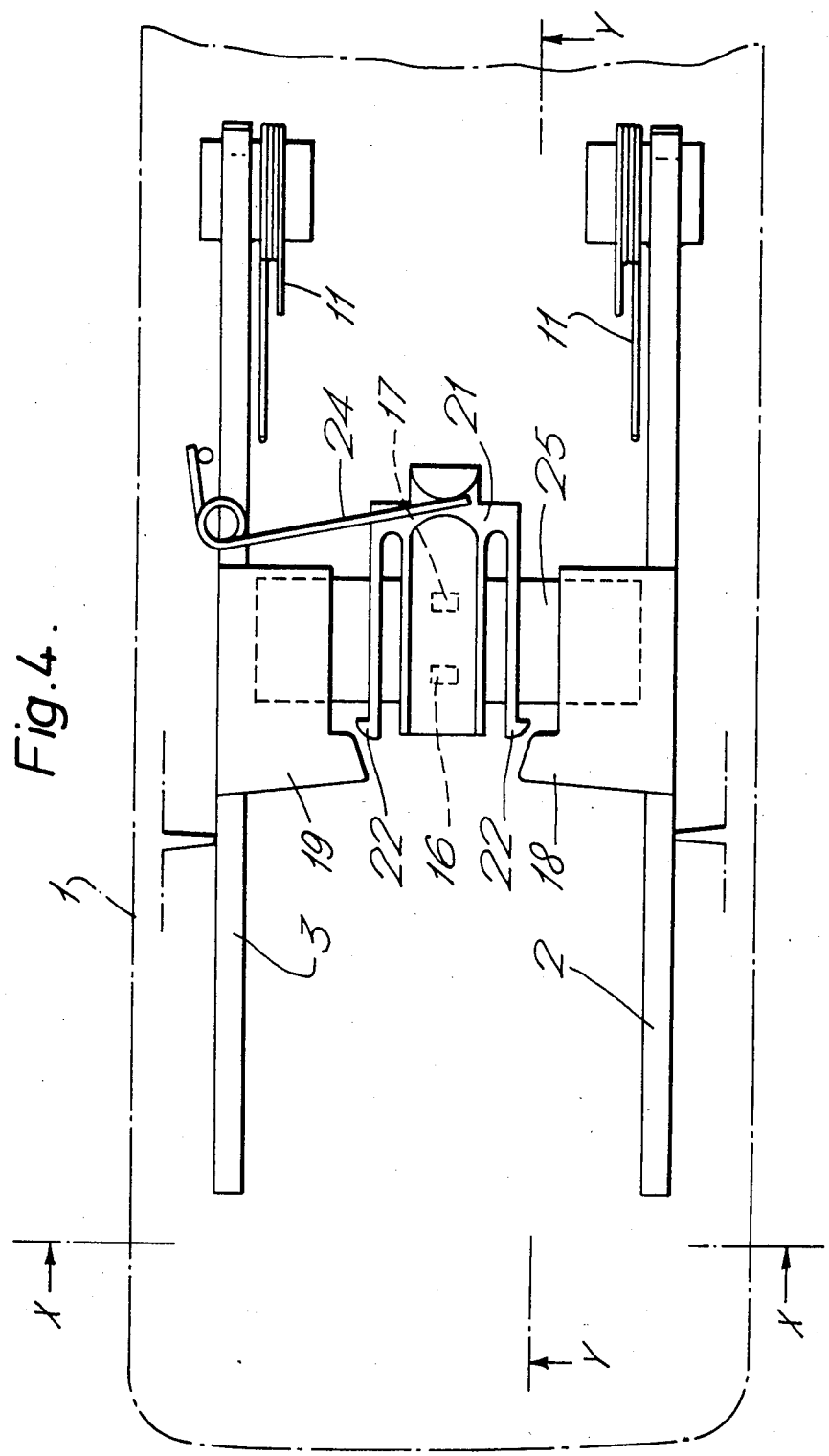

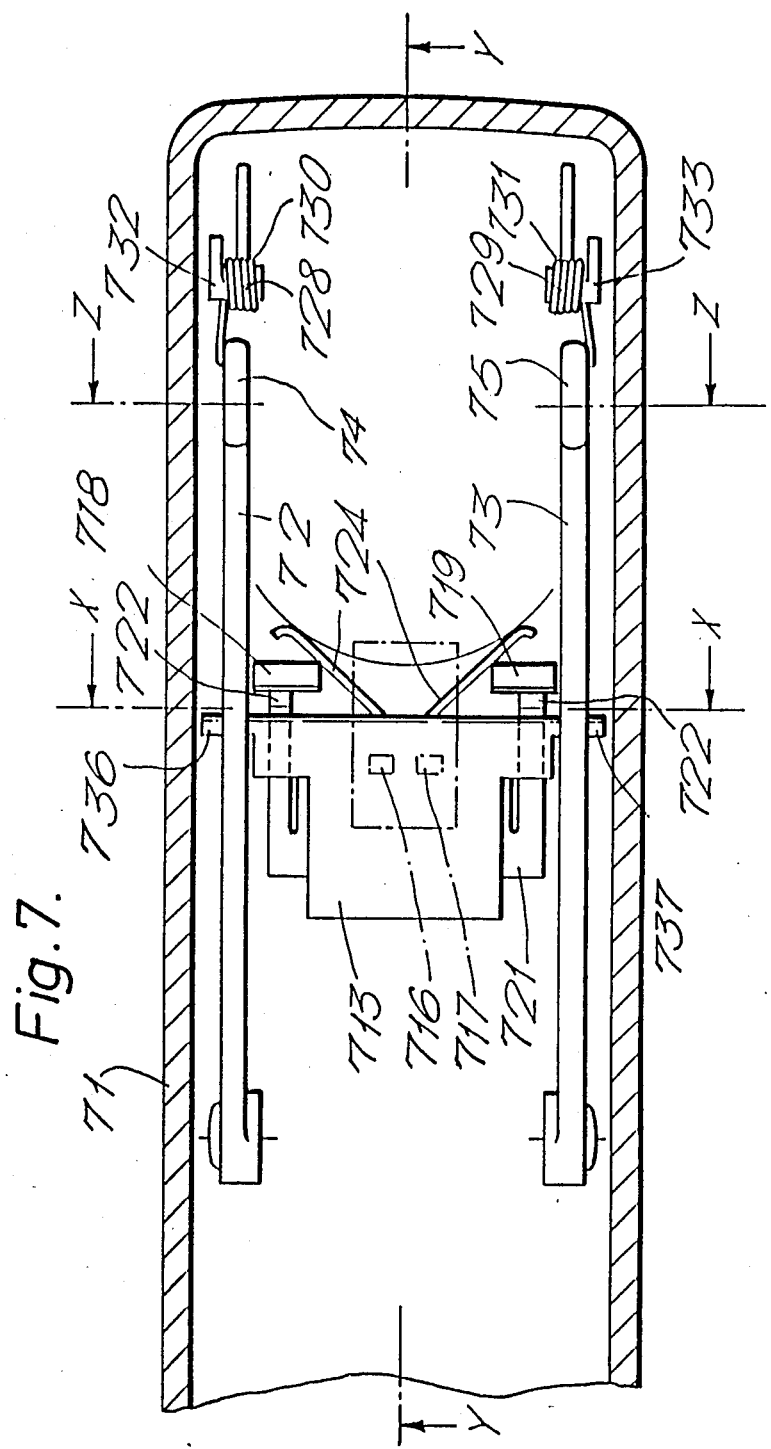

ONE-PIECE TELEPHONE HOOK SWITCH OPERATING MECHANISM

FIELD OF THE INVENTION

This invention relates to a one-piece telephone instrument provided with a hook switch operating mechanism.

BACKGROUND OF THE INVENTION

Known telephone hook switch (also known as "switch-hook") mechanism commonly comprise a pair of interlinked arms. When the mechanism is installed in the body of a telephone instrument, an end of each of these arms extends from a respective opening in a handset cradle, for detecting the presence or absence of a handset (ie for detecting whenever the instrument is in an on-hook state or an off-hook state respectively). The arms are pivotally mounted and biased towards extended positions from the handset cradle such that the arms assume these positions in the absence of the handset (the off-hook state). In the presence of the handset (the on-hook state) the arms are depressed by the handset, assuming retracted positions with respect to the handset cradle. The arms are arranged to actuate a hook switch (usually a microswitch) for controlling circuitry of the instrument.

Such known hook switch mechanisms are generally satisfactory but can be prone to inadvertent operation by the depression of just one of the extended arms in the off-hook state. Since the arms are interlinked, such an accidental displacement causes actuation of the hook switch, interrupting or terminating a telephone call in progress. This problem is of particular concern when such mechanisms are used in so-called "one-piece" telephone instruments (instruments in which the handset and body are combined). In the case of one-piece instruments, the arms of the mechanism commonly extend from a lower surface of the instrument such that they are depressed when the instrument is placed on a table, for example (ie the on-hook state). In use (the off-hook state) there is a great danger of inadvertent depression of one or other of the extended arms because the entire instrument is hand-held.

SUMMARY OF THE INVENTION

According to the invention there is provided a one-piece telephone instrument provided with a hook switch operating mechanism, the mechanism comprising: first and second members each having a respective actuating portion arranged, in use, for projection from an outer surface of a telephone instrument biased towards relatively extended positions and arranged for mutually independent displacement with respect to the said outer surface and a switch actuating member for actuating the hook switch of the telephone instrument, wherein the mechanism further includes means linking the motion of the first and second members and of the switch actuating member such that, in use, when the first and second actuating portions are both at relatively retracted positions with respect to the said outer surface the switch actuating member is disposed such that the hook switch is in the on-hook state, and when one or both of the first and second actuating portions is or are at a relatively extended position or positions with respect to the said outer surface the switch actuating member is disposed such that the hook switch is in the off-hook state.

Manually operable means could be provided for moving the switch actuating member, when the first and second members are both at the relatively retracted positions, so that the hook switch is actuated from the on-hook to the off-hook state.

BRIEF DESCRIPTION OF THE DRAWINGS

The invention will now be described by way of example with reference to the accompanying drawings, in which:

FIG. 3 is a section on the line X—X in FIGS. 1 and 2;

FIG. 4 is a horizontal section through an interior part of a one-piece telephone instrument provided with another embodiment of a switch operating mechanism according to the invention;

FIG. 6 is a section on the line X—X in FIGS. 4 and 5;

FIG. 7 is a horizontal section through part of a one-piece telephone instrument provided with another embodiment of a switch operating mechanism according to the invention;

DETAILED DESCRIPTION

Figure 1:
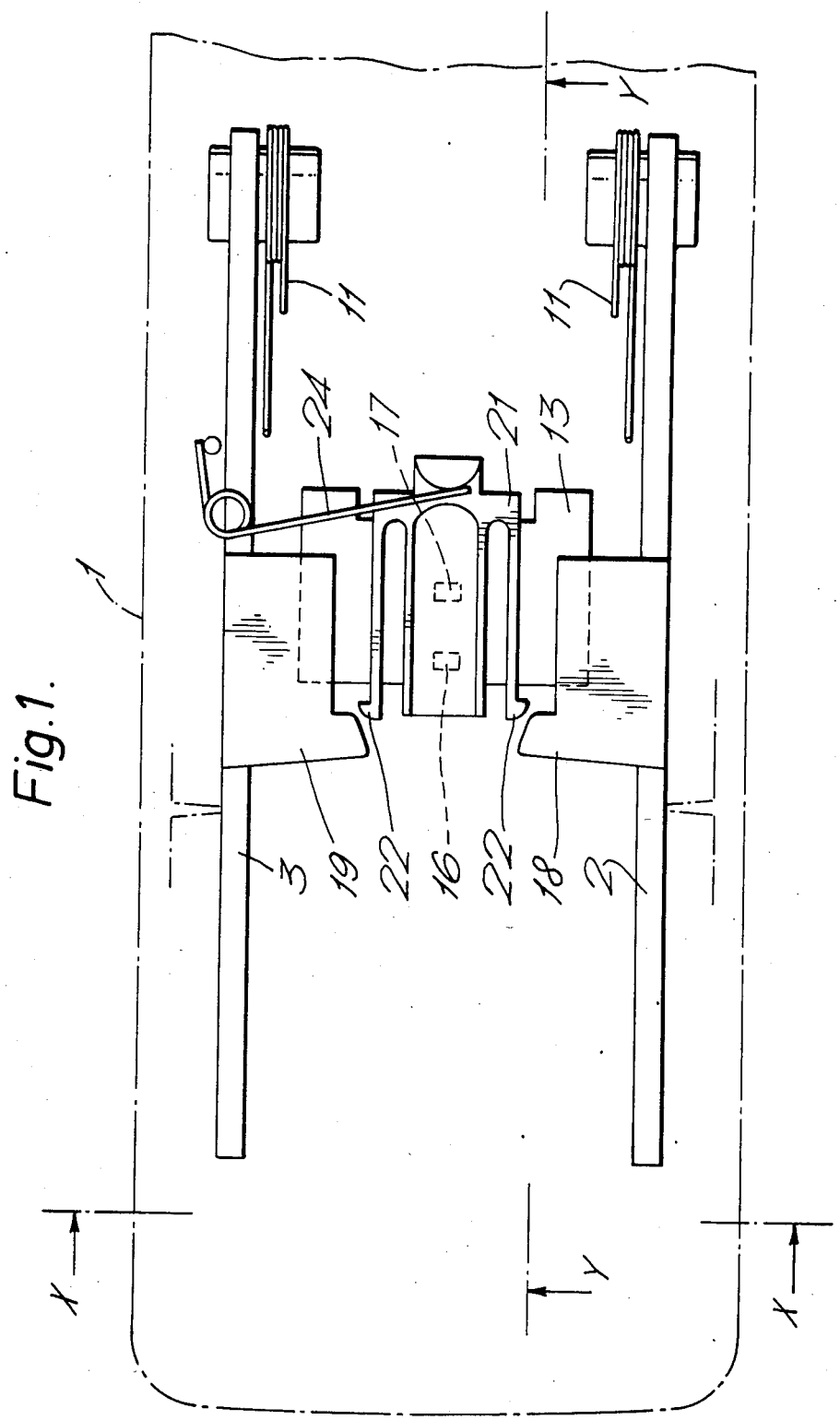
FIG. 1 is a horizontal section through an interior part of a one-piece telephone instrument provided with one embodiment of a switch operating mechanism according to the invention.
Figure 2:
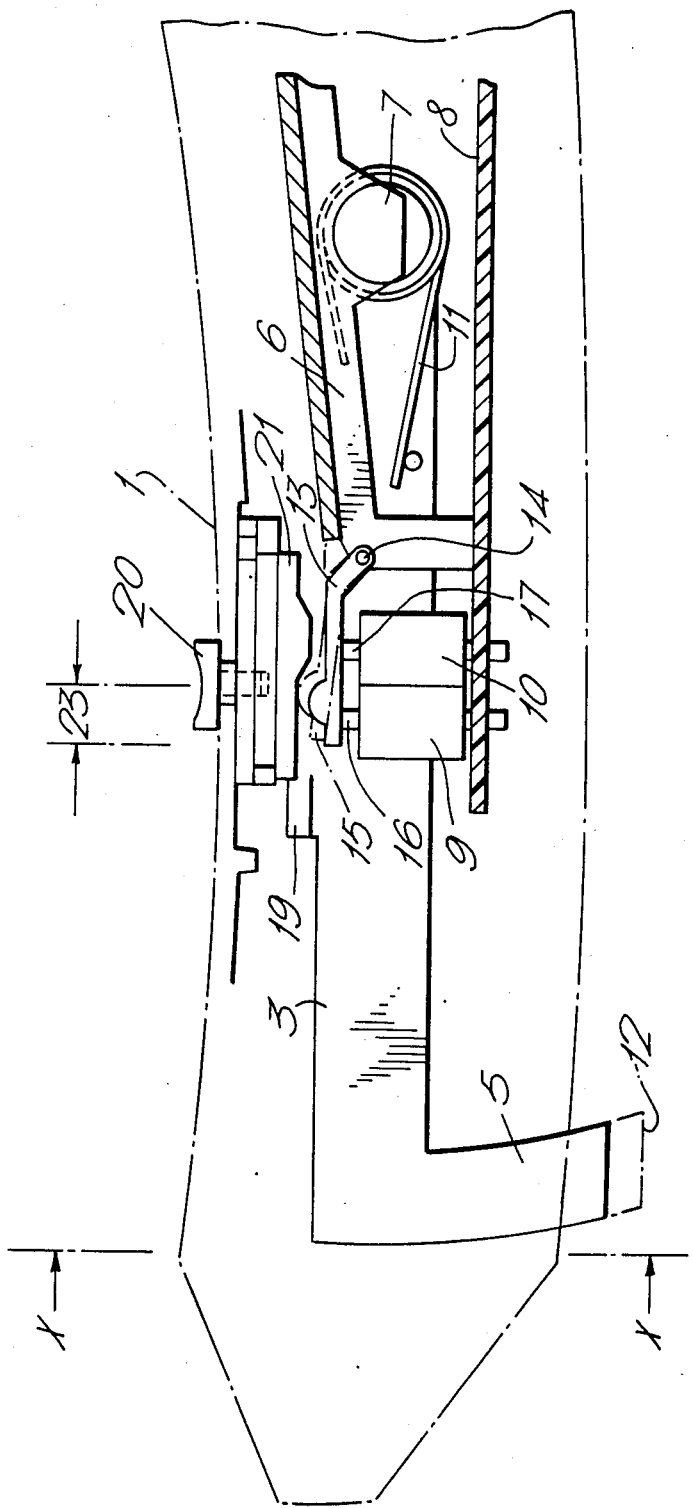
FIG. 2 is a section on the line Y—Y in FIG. 1.

Referring to FIGS. 1 (represented by phantom lines in FIGS. 1–6 and wall cross sections in FIGS. 7–11) to 3, located in the body 1 of a one-piece telephone instrument are first and second arms 2 and 3 respectively (only arm 3 being shown in FIG. 2). The arms 2 and 3 are spaced apart and arranged along part of the length of the instrument. Each of the arms 2 and 3 comprises a slightly curved portion, 4 and 5 respectively, located at one end thereof, these portions 4 and 5 being substantially perpendicular with respect to the remainder of the arms 2 and 3 respectively, such that they project through respective openings (not shown) in the underside of the body 1.

The arms 2 and 3 are pivotally attached to respective support members. Only one such support member, 6 for the arm 2, is shown (FIG. 2), the arm 2 being pivotally attached thereto at point 7. The support members are carried by a printed circuit board 8, which board also carries microswitches 9 and 10 (for on-hook/off-hood switching of the instrument) and other instrument circuitry (not shown).

The arms 2 and 3 are biased by coil springs 11 such that the portions 4 and 5 tend towards extended positions from the above-mentioned openings in the body 1.

Such an extended position for the arm 2 is indicated by the dotted line 12 in FIG. 2.

A flap 13 is pivotally attached to the support members 6 at points 14 (only one of which is shown, in FIG. 2). This flap 13 is biased by a spring (not shown) away from the microswitches 9 and 10 such that it tends towards the position indicated by dotted line 15 in FIG. 2. The lower surface of this flap 13 bears against actuating buttons 16 and 17 of the microswitches 9 and 10 respectively. Inwardly directed projections 18 and 19 of the arm 2 and 3 respectively are arranged such that they partially extend over respective edges of the flap 13.

Located on the upper surface of the body 1 is a slide button 20. This button 20 is coupled with a block 21 along the sides of which are provided two resilient tongues 22. The button 20, block 21 and tongues 22 are displaceable over the distance indicated by arrows 23 in FIG. 2, and are biased by a spring 24 (shown in FIG. 1) towards the position shown.

In operation, when the telephone instrument is placed on a surface—for example, a table—the weight of the instrument bearing on the arm portions 4 and 5, which contact the surface, overcomes the bias provided by the coil springs 11 and causes depression of the portions 4 and 5 such that they assume the relatively retracted positions indicated. With both arm portions 4 and 5 in these positions, the arm projections 18 and 19 are raised (in FIG. 3, projection 18 is shown in such a position). The projections 18 and 19 therefore no longer bear upon respective edges of the upper surface of the flap 13 and, accordingly, the flap 13 is displaced by the spring acting on it, to the position indicated by dotted line 15 in FIG. 2. This displacement permits corresponding upward displacement of the microswitch actuating buttons 16 and 17, thus actuating microswitches 9 and 10 respectively. Operation of the microswitches 9 and 10 causes circuitry of the telephone to be switched from the off-hook store to the on-hook state (ready to receive an incoming call).

It will be seen that, by virtue of the relative dispositions of the flap 13 and microswitch actuating buttons 16 and 17, the microswitches 9 and 10 are operated in sequence as the flap 13 is upwardly displaced. Thus, the microswitch 9 is actuated first—as the free end of the flap 13 releases pressure on actuating button 16—and the microswitch 10 is subsequently actuated as continued displacement of the flap 13 releases pressure on actuating button 17. This sequential actuating is used to advantage to operate circuitry of the telephone instrument in a desired sequence. For example, when the instrument is to be switched back from the on-hook state to the off-hook state on receipt of an incoming call, the microswitch 10 is actuated first, followed by microswitch 9, as a result of downward displacement of the flap 13. Microswitch 10 is used to disconnect the instrument tone caller (not shown) and microswitch 9 subsequently connects transmission circuitry (not shown) to the telephone line.

This sequential operation is particularly desirable in the case of instruments having electronic circuitry.

The downward displacement of flap 13 noted above—i.e. the switching of the instrument from the on-hook state to the off-hook state—is brought about by permitting either or both of the arm portions 4 and 5 to assume a relatively extended position or positions from the instrument body 1. This is the case when the instrument is picked up from a table, for example, the arms 2 and 3 then being biased downwards by coil springs 11.

Arm projections 18 and 19 thus act upon, and cause downward displacement, of flap 13. The projection 19 is shown in such a position in FIG. 3.

It will be appreciated that it is necessary for both arm portions 4 and 5 to be depressed to cause switching of the instrument from the off-hook to the on-hook state. Thus, when a telephone call is in progress with the instrument being held by hand, inadvertent depression of one of the arm portions (4 or 5) has no effect on the microswitches 9 and 10 since the flap continues to be held in its lower position by the projection (18 or 19) of the other arm (2 or 3). The telephone call is therefore not accidentally interrupted or terminated.

As described, the block 21 is normally biased towards the position shown in the drawings. However, when the instrument is in the on-hook state (i.e. placed on a surface with both arm projections 18 and 19 raised and flap 13 in its upper position), manual displacement of slide button 20 causes the lower surface of block 21 to act upon the upper surface of flap 13 (both of these surfaces are provided with respective raised portions for cooperation in this manner). As a result, there is downward displacement of flap 13, actuation of microswitches 9 and 10 and thus switching of the instrument to the off-hook state—i.e. ready to initiate a telephone call.

When the block 21 is displaced in the manner described above, tongues 22 are inwardly displaced by the arm projections 18 and 19 and lock therewith when the free ends of the tongues 22 engage respective ends of projection 18 and 19 (the free ends of tongues 22 being barbed to facilitate this). The block 21 will thus remain in this displaced position without further operation of button 20. When the instrument is picked up, however, both arm projections 18 and 19 are downwardly displaced and tongues 22 released, allowing the block 21 to be returned to its normal position by spring 24.

As described above, it is therefore possible to switch the instrument to the off-hook state when, in fact, it is physically in an on-hook position. This facility permits so-called "on-hook dialling", i.e. the ability to put the instrument in the on-hook state, dial a telephone number and monitor the progress of the setting-up of the telephone call, without the need to pick up the instrument itself. Once the call has been established the instrument can be picked up and the mechanism continues to maintain the off-hook state (since projections 18 and 19 rather than block 21, now bear on flap 13).

Figure 5:
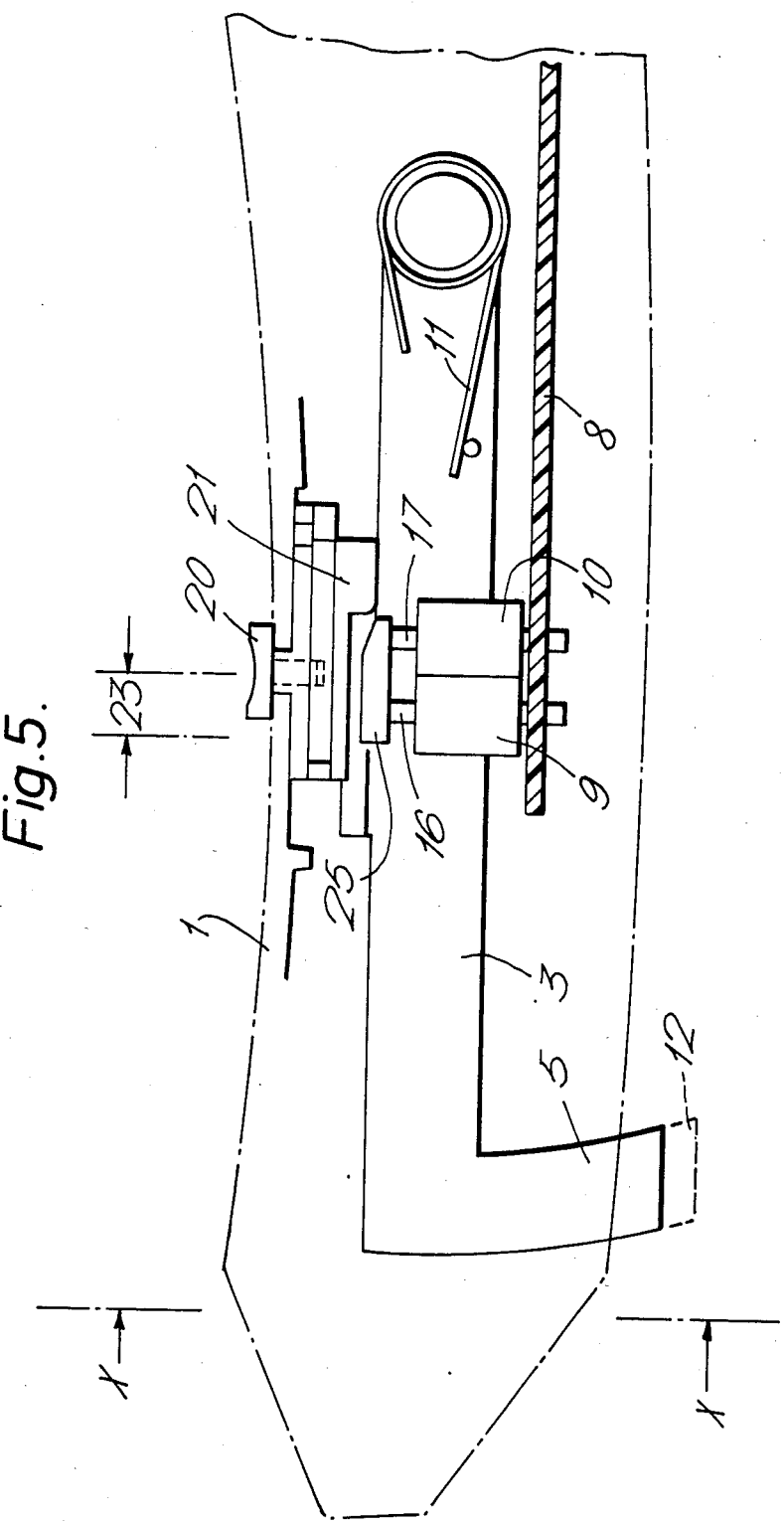
FIG. 5 is a section on the line Y—Y in FIG. 4.

FIGS. 4, 5 and 6 share a similar switch operating mechanism, some elements of which are identical to those of the mechanism of FIGS. 1 to 3 and are given corresponding reference numerals.

It will be noted that the difference between the two mechanisms lies in the arrangement of the member for actuating the microswitches 9 and 10. In FIGS. 4, 5 and 6, this member comprises a floating bar 25 which is loosely held between arm projections 18 and 19 and further, shorter arm projections 26 and 27 respectively. In contrast to flap 13 of FIGS. 1 to 3, the bar 25 is not hinged or biased.

Referring in particular to FIG. 6, in operation the effect of the loose coupling of bar 25 by arm projections 18, 19 and 26, 27 is that the bar 25 assumes a tilted position (as shown in FIG. 6) when one of the arms 2 and 3 is at an extended position from the body 1. In such a tilted position, it will be seen that the bar 25 still bears upon actuating buttons 16 and 17. Pressure on these buttons is only released—and microswitches 9 and 10 thus actuated—when both arms 2 and 3 assume relatively retracted positions, projections 26 and 27 then both lifting the bar 25 away from microswitches 9 and 10. Thus, the switch member is constrained to move by some movements of arms 2 and 3, but not others (an arrangement known to those skilled in the art as a lost motion mechanism).

Operation of the mechanism is otherwise identical to the operation of the mechanism shown in FIGS. 1 to 3.

Figure 8:
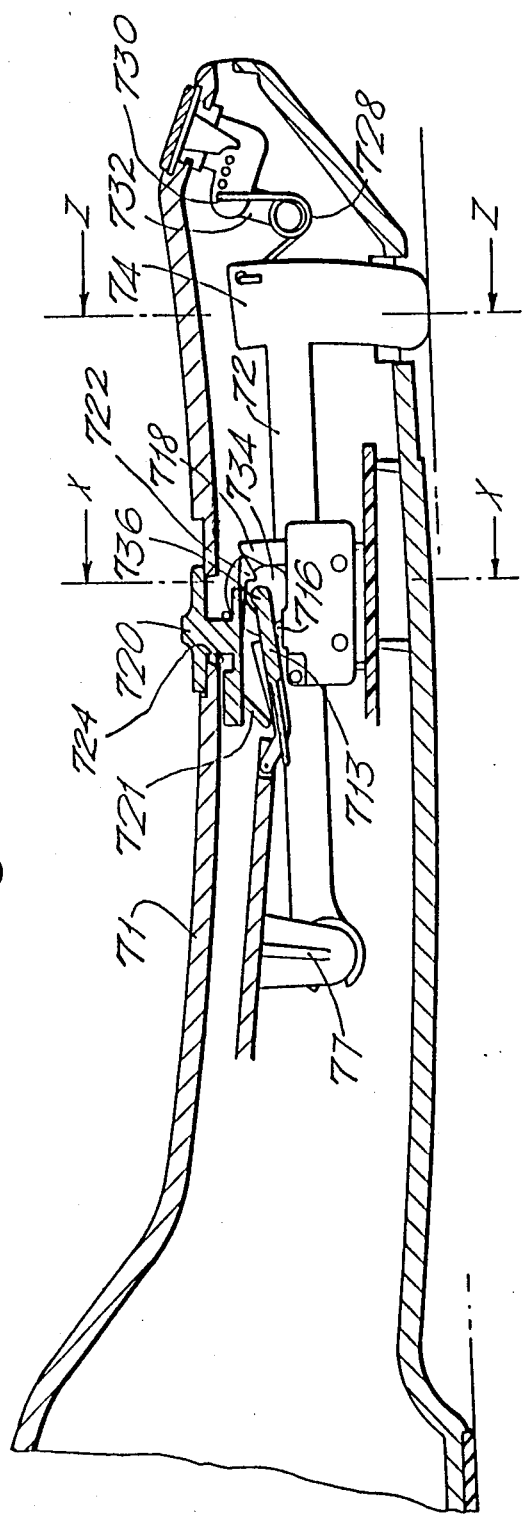
FIG. 8 is a section on the line Y—Y in FIG. 7.
Figure 9A:
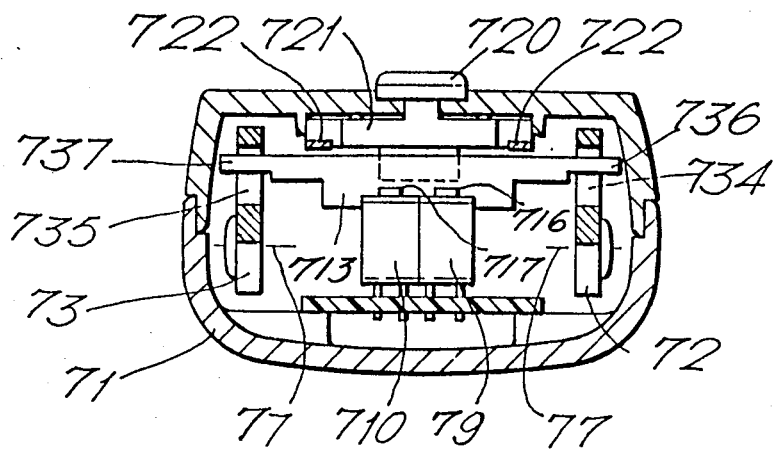
FIG. 9a is a section on the Line X—X in FIGS. 7 and 8.
Figure 9B:
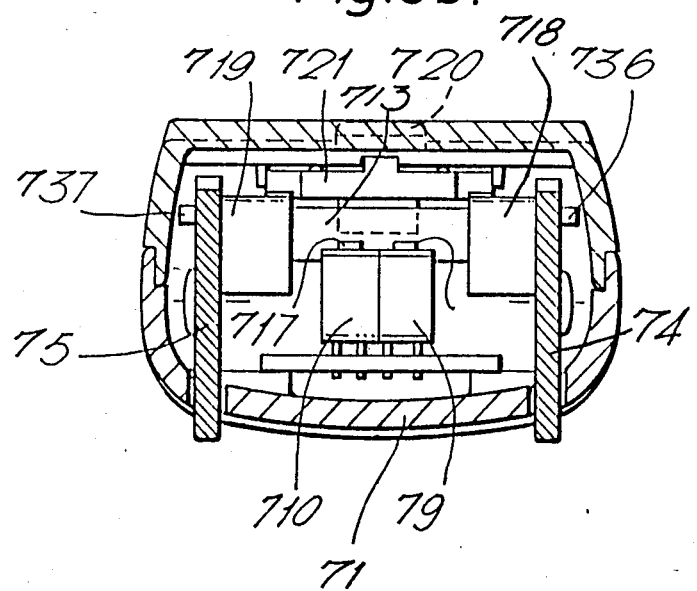
FIG. 9b is a section on the line Z—Z in FIGS. 7 and 8.

FIGS. 7, 8 and 9 share a similar switch operating mechanism, some elements of which serve the same function to those of the mechanisms of FIGS. 1-6 and are given corresponding reference numerals (in the last one or two least significant digits).

The arms 72 and 73 are pivotally attached to respective support members as previously but in this embodiment are not biased by coil springs, instead the arms are biased by torsion springs 728 and 729 operating on the upper parts of the arms portions 74 and 75. The other end of these springs 730 and 731 are located in the instrument body in such a position that the springs have a high bias force when the arms are extended. When the arms are retracted the springs force is vectored towards the pivot point 77 such that a lower bias force acts to extend the arms. This 'collapse' action is advantageous since it ensures that the instument rests more firmly down, and is less prone to bounce in the on-hook position. The torsion springs may have anchored spacers 732 and 733 to help prevent unwanted movement.

Flap 713 is pivotally attached as in FIG. 1 but in this embodiment has no spring bias. Arms 72 and 73 have openings 734 and 735 and the flap has projections 736 and 737 which are loosely located in the openings when the arms are retracted (on-hook position) such that the flap rests on the microswitch buttons but does not exert enough force to displace the microswitch activiating buttons downwards, as shown in FIG. 8. The microswitches are shown side by side in this embodiment.

When the instrument is picked up, in order to switch from the on-hook to the off-hook state: one (or both) arms 72 and 73 must be allowed to travel to their extended position, the flap projections 736 and/or 737 then bear against the side opening of the respective extended arm with the high bias force of the torsion spring acting downwards, thus the flap 713 is displaced downwards activating the microswitches 79 and 710. The flap will be maintained in this downward position as long as one or other of the arms is extended.

For on-hook dialling, manual displacement of the slide button 720 causes the lower surface of the block 721 to act on the upper surface of the flap 713 (both these surfaces are provided with respective raised portions for cooperation in this manner). As a result there is downward displacement of flap 713, activation of the microswitch 79 and 710 and thus switching of the instrument to the off-hook state.

When the block 721 is displaced in the manner described above the tongues 722 are upwardly displaced by the arm projections 718 and 719 (which do not extend over the flap in this embodiment) and lock therewith when the free ends of the tongues 722 engage respective ends of projection 718 and 719 (the free ends of tongues 722 being barbed to facilitate this). The block 721 will thus remain in this displaced position without further operation of button 720 when the instrument is picked up, however, both arm projections 718 and 719 may be downwardly displaced (the lower bias force of the torsion springs is sufficient to do this) in order to release the tongues, allowing block 721 to be returned to its normal position by spring 724. The arms are then held in their extended positions by the higher bias force of the torsion springs.

Figure 10:
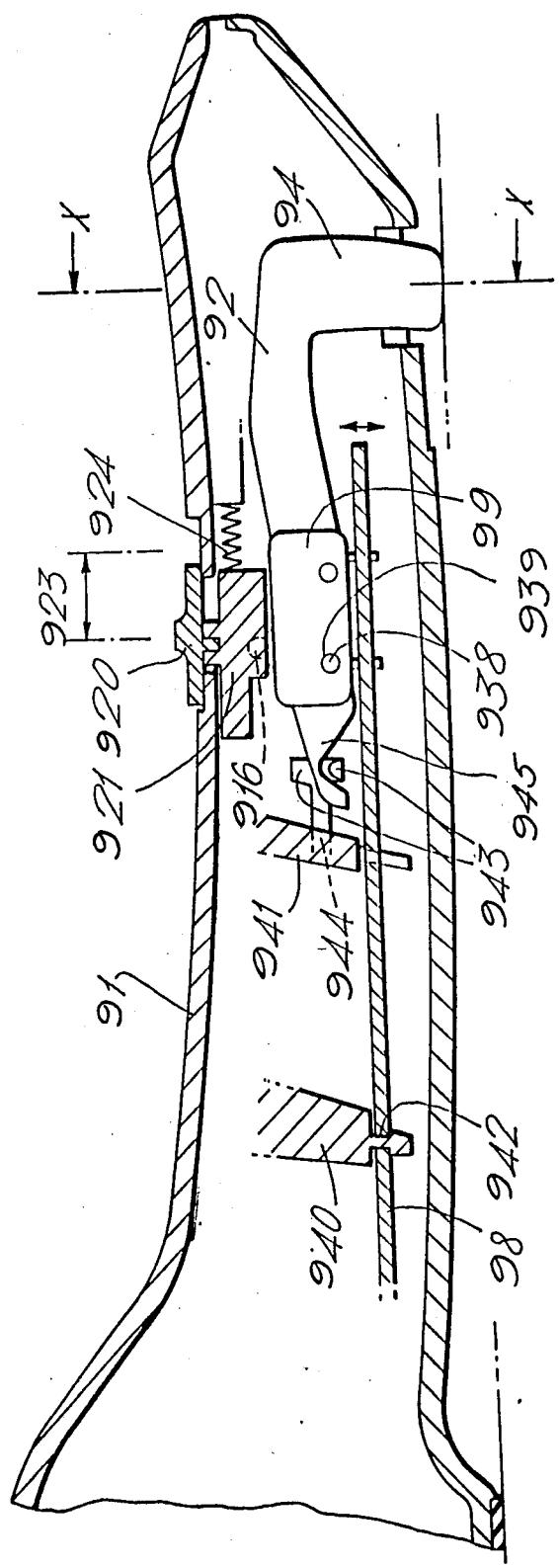
FIG. 10 is a vertical section through part of a one-piece telephone instrument provided with another embodiment of a switch operating mechanism according to the invention.
Figure 11A:
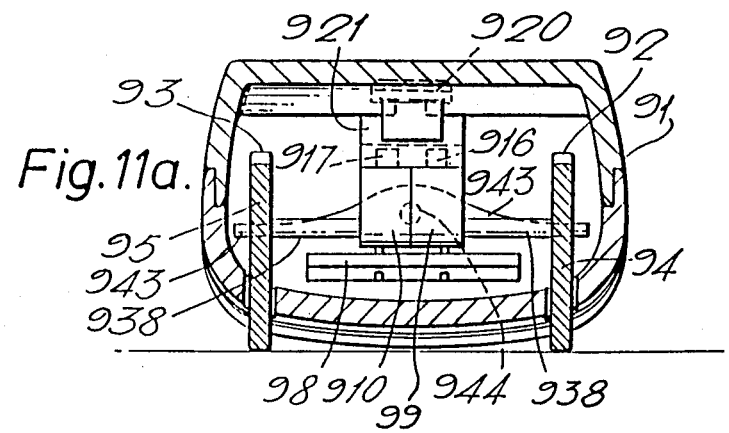
FIG. 11 a, b and c are sections on the line X—X in FIG. 10 which illustrate the mode of operation of this embodiment.
Figure 11B:
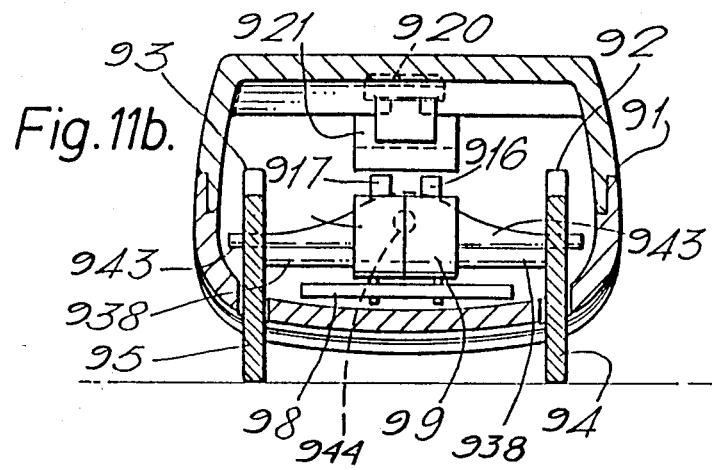
Figure 11C:
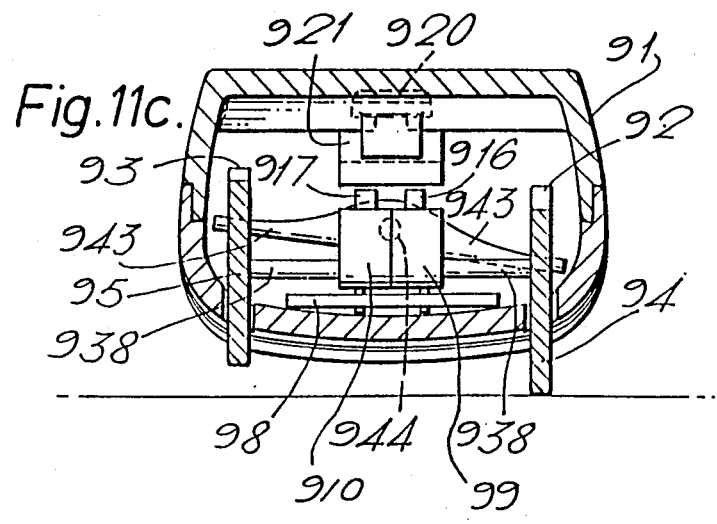

FIGS. 10 and 11 share a similar switch operating mechanism, some elements of which serve the same function to those of the mechanisms of FIGS. 1-9 and are given corresponding reference numerals (in the last one or two least significant digits).

The arms 92 and 93 are attached to a shaft 938 which passes through one of the holes through the microswitches 939, (microswitches are commonly manufactured with 2 holes, e.g. as shown in FIG. 8) such that the arms may pivot about the axis of the shaft. Bushings, not shown, may be included on the shaft between the arms and the microswitches in order to reduce unwanted motion. The microswitches are mounted on a printed circuit board PCB 98. This PCB is supported in the telephone instrument by first and second pairs of support members 940 and 941. The first support members are attached to the PCB in a manner which permits the PCB to pivot about the point of attachment 942 and the second support members are loosely attached to the PCB to allow some pivoting (about 942).

The second support members also support a yoke 43, the yoke is pivotally attached about an axis 944.

Each arm 92, 93 has a hooked portion 945 extending beyond the shaft 938 and these are arranged such that the hooked portion of each arm locates a respective end of the yoke 943.

When both the arms are retracted (see FIG. 11a) equal downward forces are transmitted by the arms onto the ends of the yoke. The yoke is therefore horizontally disposed and the arms 92 and 93 act to lift the shaft 938 upwards, pulling the end of the PCB 98 and hence the microswitches 99 and 910 up. This causes the microswitch buttons 916 and 917 to be downwardly displaced by the block 921, and the microswitches to be activated to put the instrument in the on-hook state. (This is the opposite position of the microswitch buttons during the on-hook state to the previous embodiments.)

When the instrument is picked up, in order to switch from the on-hook to the off-hook state, one (or both) arms 92 and 93 must be allowed to travel to their extended positions: Consider the situation when both arms (92 and 93) are allowed to travel to their extended positions (see FIG. 11b). The lever force acting to keep the microswitch buttons pressed-in is released and the internal springs of the microswitches cause the entire PCB 98 to pivot about 942, the microswitches moving downwards away from the block 921 so that the buttons are released to put the instrument in the off-hook state. In the situation where one of the arms is now forced into its retracted position, or only one arm is released from the retracted position to the extended position (see FIG. 11c), the retracted arm will apply a force onto the respective end of the yoke, but since no force will be exerted onto the other end of the yoke it is free to be rotated about 944 by the applied force so that no upward leverage force is transmitted to the PCB. Thus the instrument is maintained in, or, as the case may be, enters the off-hook state as long as one or other of the arms is extended.

For on-hook dialling, manual displacement of the slide button 920 causes the block 921 to move so that the block no longer acts on the microswitch buttons. As a result the internal springs of the microswitches cause the buttons to be upwardly displaced, activating the microswitches to put the instrument in the off-hook state. As a result of the upward displacement of the buttons the shape of the block 921 prevents it from being returned from its displacement position under the action of the spring 924. When the instrument is picked up, however, the PCB may rotate under its own weight so that the buttons no longer obstruct the return of the block 921.

It will be appreciated that a wide variety of further arrangements is possible for operation in the manner described. For example, the flap 713 of FIGS. 7–9 could be pivoted on a shaft travelling through one of the holes of the microswitches.

What is claimed is:

1. A one-piece telephone instrument provided with a hook switch operating mechanism, the mechanism comprising: a first and second members each having a respective actuating portion arranged, in use, for projection from an outer surface of said telephone instrument biased towards relatively extended positions, and arranged for mutually independent displacement with respect to said outer surface; and a switch actuating member for actuating the hook switch of said telephone instrument, wherein the mechanism further includes means linking the motion of the first and second members and of the switch actuating member such that, in use, when the first and second acutating portions are both at relatively retracted positions with respect to the said outer surface the switch actuating member is disposed such that the hook switch is in the on-hook state, and when one or both of the first and second actuating portions is or are at a relatively extended position or positions with respect to said outer surface the switch actuating member is disposed such that the hook switch is in the off-hook state.

2. A one-piece telephone instrument provided with a switch operating mechanism according to claim 1 wherein each of the first and second actuating portions is biased with a relatively stronger force component in the direction of the projection from an outer surface with it is in the said relatively extended position, and biased with a relatively weaker force component in the direction of the projection from an outer surface when it is in the said relatively retracted position.

3. A one-piece telephone instrument provided with a hook switch mechanism according to claim 1 or 2, wherein the first and second members are each pivotally mounted at a point remote from the actuating portion, with lost motion means linking the two members to thw switch actuating member.

4. A one-piece telephone instrument provided with a hook switch operating mechanism according to claim 3, further comprising manually operable means for moving the switch actuating member, when the first and second members are both at the said relatively retracted positions so that the hook switch is actuated into the off-hook state.

5. A one-piece telephone instrument provided with a hook switch operating mechanism according to claim 4 wherein the manually operable means is manually operable from a first position against a spring bias to a second position for moving the switch actuating member, when the first and second members are both at the said relatively retracted positions, and latching means are provided to maintain the manually operable means in the second position until the latching means are released by the movement of the first and second members from the relatively retracted positions to the relatively extended positions, allowing the manually operable means to return from the second position under the action of the spring bias.

6. A one-piece telephone instrument provided with a hook switch operating mechanism according to claim 1 or 2 wherein the first and second members each have two ends, one end of each having the actuating portion, and the end of each remote from the actuating portion having lost-motion engagement with the ends of a transversely extending elongate member pivotally mounted for rotation about an axis generally parallel to the first and second members, and each of the first and second members is pivotally secured at a point between the two ends thereof.

7. a one-piece telephone instrument provided with a hook switch according to claim 1 wherein the telephone instrument is of an elongate shape having the actuating portions arranged, in use, for projection from one of the long outer surfaces; the arrangement being such that resting the instrument substantially horizontally along said one of the long outer surfaces upon a substantially flat surface causes both the actuating portions to be depressed and the hook switch to be actuated to the on-hook state.

* * * * *